United States Patent [19]

Holladay

[11] 4,276,249
[45] Jun. 30, 1981

[54] PROCESSES FOR SEALING HOLLOW FIBER MEMBRANES ARRANGED IN THE FORM OF A BUNDLE

[75] Inventor: Harry P. Holladay, Raleigh, N.C.

[73] Assignee: Monsanto Company, St. Louis, Mo.

[21] Appl. No.: 78,873

[22] Filed: Sep. 26, 1979

[51] Int. Cl.³ .............................................. B32B 21/00
[52] U.S. Cl. ...................................... 264/139; 264/25; 264/80; 264/138; 264/159; 264/163; 264/241; 264/257; 264/322
[58] Field of Search ............... 264/139, 163, 138, 159, 264/322, 25, 80, 241, 257

[56] References Cited
U.S. PATENT DOCUMENTS 3,968,192  7/1976  Hoffman ................................ 264/36
4,183,890  1/1980  Bollinger .............................. 264/139

OTHER PUBLICATIONS

Central Patents Index, Accession Number 42798u (Sep. 6, 1973).

Primary Examiner—James H. Derrington
Attorney, Agent, or Firm—Thomas E. Kelley; Norman L. Balmer; Howard C. Stanley

[57] ABSTRACT

Processes are disclosed for sealing the ends of the bores of a plurality of hollow fiber membranes comprised of a thermoplastic material which membranes are arranged in the form of a bundle by subjecting the ends of the hollow fiber membranes to heat to effect the sealing. The heat also causes the ends of the hollow fiber membranes to adhere to one another. An insert material is placed within the bundle of hollow fiber membranes at the zone which is subjected to the heat. This insert material provides a barrier to the adhering of the hollow fiber membranes and thus provides a fluid passageway at the sealed end of the bundle.

22 Claims, 5 Drawing Figures

PROCESSES FOR SEALING HOLLOW FIBER MEMBRANES ARRANGED IN THE FORM OF A BUNDLE

This invention relates to processes useful in the fabrication of permeators containing hollow fiber membranes for separation of at least one fluid from a fluid mixture containing at least one other fluid. More particularly, this invention pertains to processes for sealing the bores at the ends of a plurality of hollow fiber membranes which are arranged in the form of a bundle by subjecting the ends of the hollow fiber membranes to heat to effect the sealing wherein fluid passageways are provided at the sealed end of the bundle.

Membranes in the form of hollow fibers are frequently advantageous for use in permeators in view of the relatively high membrane surface area which can be achieved per unit volume of the permeator. Moreover, hollow fiber membranes can be self supporting and can withstand high pressure differentials across their walls. The use of large pressure differentials is very attractive in many separation operations, e.g., ultrafiltration and reverse osmosis, separation of gaseous mixture and the like, in order to achieve large driving forces for the permeation and thereby provide a greater flux through the membrane.

Permeators containing hollow fiber membranes are usually characterized by having means to prevent fluid communication between the feed side and permeate exit side of the membranes except through the walls of the hollow fiber membranes. Hence, generally at least one end of each of the hollow fiber membranes in the permeators is encased, or embedded, in an essentially fluid tight relationship in the tube sheet such that the bore of the hollow fiber membrane is in fluid communication through the tube sheet. The other end of each of the hollow fiber membranes is also an essentially fluid-tight relationship between the exterior and the bore of the membrane. The desired relationship can be achieved by embedding the end of the hollow fiber in a tube sheet, which may be a separate tube sheet or the same tube sheet in which the other end of the hollow fiber membrane is embedded. Alternatively, the other end of the hollow fiber membrane may be sealed in an essentially fluid-tight manner. This sealed end is herein referred to as the plug end. For purposes of this specification, permeators in which each end of the hollow fiber membranes is embedded in a separate tube sheet are referred to as double-ended permeators; and permeators in which only one end of each of the hollow fiber membranes is embedded, or in which both ends of the hollow fiber membranes are embedded, in the same tube sheet are referred to as single-ended permeators.

Desirably, the fabricating of tube sheets and, in single-ended permeators, the plug end does not unduly adversely affect the strength or separation performance of the hollow fiber membranes. Hollow fiber membranes, especially anisotropic membranes having a thin dense skin, or barrier layer, supported by a more open wall structure, may be fragile. Consequently, procedures for fabricating tube sheets and plug ends should minimize the risk of damage to the hollow fiber membranes. The damage which may occur to the hollow fiber membranes may be observed as a decrease in selectivity of the membrane or a weakening of the structure of the hollow fiber membrane such that the ability to utilize the advantageously large pressure differentials may be diminished. Moreover, these fabricating procedures should be advantageously capable of being performed quickly, easily and without the exercise of an undue level of skill on the part of the fabricator.

Frequently, permeators are fabricated by forming a bundle of hollow fiber membranes which is then cut to length, e.g., by the use of knives, a heated member such as disclosed and claimed by M. L. Woodcock in copending United States patent application Ser. No. 078,871 filed Sept. 26, 1979 filed concurrently herewith (said patent application herein incorporated by reference), and the like. At least one end of the bundle which is cut to length is formed into a tube sheet. In forming the tube sheet, means must be employed to prevent the material which forms the tube sheet from being drawn into the bores of the hollow fiber membranes by capillary action. Typically, if the bores at the ends of the hollow fiber membranes are not already sealed, a cement, wax or other removable material is applied to the ends of the hollow fiber membranes prior to the formation of the tube sheet to avoid filling the bores of the hollow fiber membranes with the material of the tube sheet. The end of the tube sheet can be removed such that the bores of the hollow fiber membranes are exposed. Similarly, when forming a plug end from a resinous material, the bores of the hollow fiber membranes must be sealed. The techniques of providing the cement or liquifiable material at the end of the bundle require manpower and handling which could increase the risk of damage to the hollow fiber membranes.

Alternatively, the bundle could be formed with the hollow fiber membranes being looped such that a single, continuous hollow fiber forms numerous lengths in the bundle, i.e., the hollow fiber membranes are in the form of hanks. While this technique provides that the ends of the bundle are closed, the looping of the hollow fibers to form the hanks can provide stresses which may damage the hollow fiber membranes, and it may be difficult to obtain a desirable population distribution of the hollow fiber membranes in the tube sheet. An uneven population distribution of the hollow fiber membranes may result in poor distributions of fluid in the permeator at the exterior of the hollow fiber membranes during separation operations. Hence localized areas within the permeator may have little fluid flow while other areas may have such substantial fluid flow that, e.g., when the feed to the permeator is fed to the exterior of the hollow fiber membranes, a significant portion of the feed may pass through the permeator without separation.

In single-ended permeators, the plug end of the bundle may be formed by looping the hollow fiber membranes or by plugging the open ends of the hollow fiber membranes. Bundles in which the plug end is formed by looping the hollow fiber membranes may result in an uneven population distribution and/or stresses being placed on the hollow fiber membranes which could damage the membranes. The problem of stresses on the looped portion of the hollow fiber membranes may be further amplified when the bundle is designed to tightly fit within the shell of the permeator in order to prevent fluid by-passing between the bundle and the vessel containing the bundle. Thus, the plug has typically been formed by embedding the ends of the hollow fiber membranes in a solidifiable material or by sealing the bores at the end of the hollow fiber membranes by melting to close the ends.

A particularly useful procedure for sealing the bores at the ends of hollow fiber membranes is by the use of heat to melt the ends of the hollow fiber membranes closed. This procedure can often be accomplished quickly and without undue adverse effects on the performance or strength of the hollow fiber membrane. For instance, the procedure disclosed by Woodcock in the above referenced copending patent application involves passing a heated member transversely through a bundle of hollow fiber membranes to sever and seal the ends of the hollow fiber membranes. Often these procedures using heat to seal the ends of the hollow fiber membranes result in the hollow fiber membranes becoming adhered to one and another at the zone through which the heated member is passed. This adhering, or matting together, of the hollow fiber membranes can be highly advantageous in that the severed end of the bundle is capable of substantially maintaining its cross-sectional configuration even in the absence of external support and the ends of substantially all of the hollow fiber membranes in the bundle are bound together. Moreover, the handling of the bundle may be facilitated since the hollow fiber membranes are joined. Difficulties, however, may arise in that the adhering of the hollow fiber membranes at the end of the bundle may result in a substantial decrease in the ability of fluids to pass through the end of the bundle. These difficulties may adversely affect the preparation of permeators and possibly the fluid separation performance of the permeators. For instance, it may be desired to embed the severed end of the bundle of hollow fiber membranes in a resinous mass in order to form a tube sheet or a plug end. Particularly with large diameter bundles, the problems in obtaining a relatively uniform distribution of the resinous material throughout the bundle may be increased if the resinous material has difficulty in passing through the end of the bundle. In single ended permeators in which the plug is formed by sealing the ends of the hollow fiber membranes with heat, the difficulties in passing fluids through the plug end may adversely affect the distribution of fluid throughout the bundle, and thus the performance of the permeator would be deleteriously affected.

In accordance with this invention there are provided processes for sealing the bores at the ends of hollow fiber membranes by subjecting the ends to sufficient heat to seal the bores and also result in the hollow fiber membranes adhering to one and another wherein fluid passageways are provided at the sealed end of the bundle. The passageways in the sealed end of the bundle can be provided through relatively non-complex procedures which do not provide any significant adverse effect on the performance or strength of the hollow fiber membranes. Moreover, the processes of this invention enable a wide variety of frequencies, configurations, and distributions of fluid passageways to be achieved at the sealed end of the bundle.

In the processes of this invention, a plurality of hollow fiber membranes comprised of thermoplastic material are arranged to provide a bundle having a zone to be sealed of a desired cross-sectional configuration. Within this zone is provided a substantially non-sealing insert member. The end of the bundle is then subjected to sufficient heat to melt the ends of the hollow fiber membranes in order to cause hollow fiber membranes to adhere at the end of the bundle to adjacent hollow fiber membranes. The heat may close the bores, or, if previously closed, may ensure that the bores of the hollow fiber membranes are closed. The substantially non-sealing insert member provides a boundary to the adhering of the hollow fiber membranes and results in passageways being provided through the end of the bundle. Advantageously, the end being sealed is maintained substantially in the desired cross-sectional configuration for assembly in the permeator. After the sealing of the ends of the hollow fiber membranes, the insert member may be retained or at least partially removed from the end of the bundle.

The insert member is substantially solid at ambient temperatures (i.e., is substantially non-flowing) and exhibits sufficient strength to facilitate its insertion into the bundle. Advantageously, the insert member is a substantially non-thermoplastic material. Thermoplastic materials may also be useful, particularly thermoplastic materials which are not melted under the conditions of the sealing or which, when melted, exhibit little, if any, adherence to the hollow fiber membranes. In instances in which the hollow fiber membranes are severed and sealed in the same operation, it is preferred that the insert materials be capable of being substantially severed due to the heat for severing and sealing, e.g., from a heated member in order to minimize the pressures which may be required in severing the bundle. By minimizing the pressures required to sever the bundle, the risk of damage to the hollow fiber membrane is minimized. For instance, if the insert member is a substantially non-thermoplastic material, it preferably is capable of charring such that it is severed due to the heat or becomes highly frangible that only a slight pressure will effect the severing. Alternatively, the insert material may be a thermoplastic material which, when melted, exhibits little adherence to the hollow fiber membranes. If the insert material is composed of thermoplastic material, it should have a sufficiently low melting point that it can be severed by the heat or should be so softened by the heat that little if any pressure from the heated member will effect the severing.

Accordingly, the material for the insert member may be selected from a wide variety of materials. Particularly preferred to materials for insert members include cellulosic type materials such as paper, which cellulosic-type material may or may not be treated with flame retardants. Polyethylene is often useful as a thermoplastic insert material since polyethylene often has little affinity towards a hollow fiber membrane. Liquifiable material such as waxes may also be useful as insert members. The liquifiable material can be removed from the end of the bundle after the sealing by subjecting the end of the bundle to sufficient heat to melt the liquifiable insert member but insufficient to result in damage to the hollow fiber membranes.

The insert member may have any convenient configuration such as sheets, ribbons, bars, and the like which are a closed structure (i.e., solid within its perimeter) as well as tubes which may be cylindrical, conical, polygonal, or other convenient configuration which are an open structure (i.e., an opening exists within its perimeter). Insert members having an open structure may or may not be adapted to receive hollow fiber membranes within their dimensions.

The size of the insert member may vary over a wide range. However, it is usually desirable that the insert members have a sufficient dimension running along the longitudinal axis of the bundle that it extends through the zone of sealing of the hollow fiber membranes. The insert member may extend completely through the width of the bundle, or it may extend only partially through the width of the bundle. The determination of the desired pattern (and consequently size) of the insert member is often based upon the fluid passageways which are desired in the end of the hollow fiber membrane bundle. In some instances, the insert member may also be useful in assisting the distribution of fluids throughout the bundle during the separation operations. For instance, when the plug end is formed by sealing the end of the bundle with heat, the insert member may provide channels through the plug end which assist in the distribution of fluid.

In one aspect of this invention the insert member provides or enables regions of the hollow fiber membranes in the bundle to be sufficiently spaced apart that at least one longitudinal channel exists. These longitudinal channels, for instance, may extend beyond the portion of the bundle which is embedded in a tube sheet and assist in the distribution of fluids into the bundle during separation operations.

In another aspect of this invention, the insert member extends from edge to edge of the bundle such that the bundle is segmented. This aspect of the invention is particularly useful when the sealed end of the bundle is to be embedded in a resinous mass for forming a tube sheet or plug end since the segments can, if desired, be spaced apart during the embedding such that passageways exist not only at the sealed end but also beyond the region which is embedded in the resinous mass such that distribution channels exist to the interior of the bundle which may assist fluid distribution in the bundle during fluid separation operations. The insert member which segments the bundle may pass through the bundle in any suitable configuration. For instance, the insert member may provide a boundary which is substantially straight or curved. The segments defined by the insert member may be the same or different sizes, and the segments may be symmetric or asymmetric. One convenient pattern formed by the insert member defines segments of approximately the same size and configuration. Thus, pie-shaped segments are attractive for bundles having generally circular cross-sectional configurations. The number of pie-shaped segments may be as few as three; however, it is generally preferred to utilize more pie-shaped segments with the larger diameter bundles. Often, four, six or eight pie-shaped segments are employed. If desired, these pie-shaped segments may be further segmented. Another convenient pattern is formed by a series of insert members extending across the bundle such that segments shaped as bands of sealed hollow fiber membranes are provided. The maximum width of the bands is often up to about 10 or 20 centimeters, say, about 1 to 5 centimeters. Advantageously, fluids need only permeate one-half the width of the bands in order to be distributed within the bundle. Thus, for instance, the embedding of the end of the bundle in a curable resinous mass is facilitated.

One frequent advantage of employing substantially straight or relatively uniformly curved insert members is ease in which the insert member can be placed in the bundle. For example, often a bundle of hollow fiber membranes is formed prior to the insertion of the insert member. The insert member, for instance, a sheet of paper, can be readily positioned in the bundle by parting the bundle with a smooth, blunt object which is passed through the bundle transverse to the orientation of the hollow fiber membranes and then inserting the insert member into the thusly formed part.

When the segments are desired to be spaced apart in order to form larger passageways through the sealed end of the bundle and/or in order to provide passageways in the bundle beyond any region, e.g., embedded in a resinous mass to form a tube sheet or plug end, the desired spacing may be achieved by using an insert member having an open structure or an insert member having a closed structure which has at least one region of suitable thickness to provide the desired spacing apart of the segments. Alternatively, means may be employed to spread and hold apart the segments after the sealing.

In another aspect of this invention, the insert member does not extend to the periphery of the bundle, i.e., the insert member is an internal insert member. The internal insert members frequently have open structures, although closed structures may also be useful. The internal insert members having an open structure may either have an essential absence of hollow fiber membranes within its boundaries or may encompass hollow fiber membranes. When the interior of the insert member is free from hollow fiber membranes, any adhering of the hollow fiber membranes to the insert member is often not deleterious when the insert member is not removed from the end of the bundle. In these instances, the insert member may even comprise the thermoplastic material of the hollow fiber membranes to ensure that sufficient joining of the insert member and the hollow fiber membranes occurs at the end of the bundle that the insert member is retained within the bundle. The passageways formed by the insert member may be utilized to enhance fluid transport through the sealed end of the bundle, or they may provide openings to enable fluid distribution conduits, instrument probes, or the like to enter the bundle through the sealed end.

Aspects of the invention are depicted in connection with the attached drawings in which.

Figure 1:
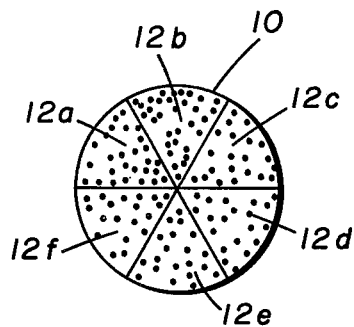
FIG. 1 is a schematic illustration of a sealed end 10 of a bundle of hollow fiber membranes, which bundle has a circular cross-sectional configuration and has pie-shaped segments 12a to f produced by a process in accordance with this invention in which the segment boundaries are formed by insert members.
Figure 2:
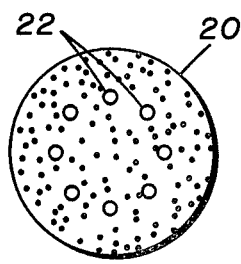
FIG. 2 is a schematic illustration of a sealed end of a bundle 20 of hollow fiber membranes, which bundle has a circular cross-sectional configuration and has a plurality circular openings 22 produced by a process in accordance with this invention wherein the circular openings are formed by insert members.
Figure 3:
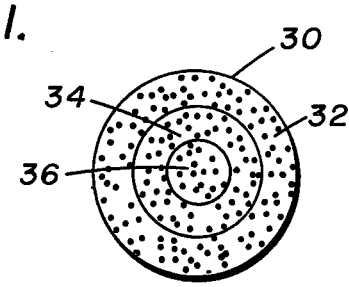

FIG. 3 is a schematic illustration of a sealed end of a bundle 30 of hollow fiber membranes, which bundle has a circular cross-sectional configuration and has concentric segments 32, 33 and 34 produced by a process in accordance with this invention wherein the segments are formed by insert members.

Figure 4:
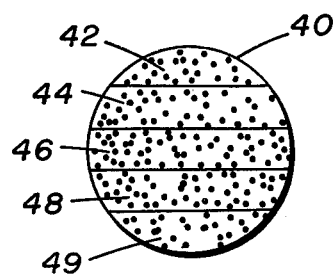

FIG. 4 is a schematic illustration of a sealed end of a bundle 40, which bundle has a circular cross-sectional configuration and has segments 42, 44, 46, 48 and 49 in the shape of bands produced by a process in accordance with this invention wherein the segments are formed by insert members.

Figure 5:
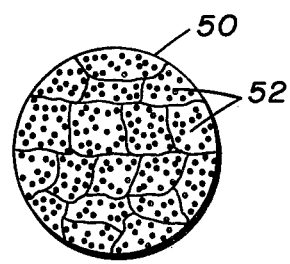

FIG. 5 is a schematic illustration of a sealed end of a bundle 50, which bundle has a circular cross-sectional configuration and a plurality of segments 52. The bundle is formed from sub-bundles which are bound at the end with insert members and the segments are produced by a process in accordance with this invention.

The sealing of the bores of the hollow fiber membranes at the end of the bundle and causing the ends of the hollow fiber membranes to adhere to adjacent hollow fiber membranes is effected by subjecting the end of the bundle to heat. If necessary, it may be desirable to provide an axially-applied pressure (e.g., a pressure provided by a surface abutting the ends of the hollow fiber membranes) in order to facilitate the closing of the bores of the hollow fiber membranes and the joining of the hollow fiber membrane at the end of the bundle. Also, if desired, the bores may be subjected to a lower pressure (e.g., subatmospheric pressure) than the exteriors of the hollow fiber membranes in order to facilitate closing the bores of the hollow fiber membranes. Preferably, the ends of the hollow fiber membranes are heated to a temperature above the melt temperature of the hollow fiber membrane, and the pressure (if utilized) be applied while the thermoplastic material is melted in order to join the ends of the hollow fiber membranes. Caution should be exercised in order that no undue damage occurs to the hollow fiber membranes. Usually, if any axially-applied pressure is required, a relatively small pressure will be sufficient in order to enable sufficient flowing of the thermoplastic material to join together the ends of the hollow fiber membranes in the bundle. Advantageously, the pressure is supplied by a surface which is continually being heated.

The heat to melt the hollow fiber membranes to cause the closing of the bores and joining of the hollow fiber membranes at the end of the bundle may be supplied by any suitable means. For instance, the heat may be supplied by a heated member, by a laser beam, by hot gases (e.g., a hot air blower), by torches, or the like. If desired, the closing of the bores and joining of the hollow fiber membranes at the end of the bundle may be conducted subsequent to or essentially simultaneously with severing of the hollow fiber membranes to form the end of the bundle. The particular means for supplying the heat to the end of the bundle will therefore be selected depending upon the total function which it is to provide. For instance, hot air blowers, flat-tipped soldering irons, flat ribbons of electrical resistance material may be useful for treating bundles which do not require severing whereas laser beams, cutting torches, wires, ribbons (including untwisted as well as twisted or helically wound ribbons, blades, rods, bars, and the like) may be useful for severing the bundle and also closing the bores and joining the hollow fiber membranes at the end of the bundle.

Heated members are often used in processes in accordance with this invention. The heated member may be exclusively preheated or may be capable of being heated during the sealing such as by electrical resistance. If the heated member is exclusively preheated and also effects severing, sufficient heat should desirably be retained within the heated member to effect the severing and sealing of substantially all of the hollow fiber membranes in the zone of the severing in a single pass. Otherwise plural passes of the heated member into the bundle may be required in order to effect the desired severing and sealing. The use of such plural passes may increase the risk that bores of the hollow fiber membranes are not desirably sealed as well as increase the time and effort required to sever and seal the hollow fiber membranes. When the heated member is exclusively heated prior to the severing, it is desirable that it be sufficiently large with respect to its heat capacity that adequate heat is available for severing and sealing substantially all of the hollow fiber membranes in the zone for severing. However, although less convenient, the zone of hollow fiber membranes may be severed a portion at a time.

Most preferably, the heated member is heated during the sealing. Any suitable means may be employed to provide heat to the heated member during the sealing. In such heated members, usually sufficient heat is produced during the sealing to effect the sealing and, if appropriate, severing.

The heated member may be heated by any suitable means. For instance, heat may be supplied to the heated member in a region remote from the region which acts upon the bundle of hollow fiber membranes, and the heat is transmitted by conduction through the heated member. A particularly attractive and convenient means to heat the heated member during severing is by applying an electrical current through the heated member wherein the heated member is composed of an electrical resistance material such as Nichrome TM alloy (an alloy containing nickel, chromium and iron). When utilizing an electrical current passing through the heated member as the means to generate heat, it is usually preferred for purposes of safety that relatively low voltages are employed. The cross-sectional area of the heated member should therefore be adequate to enable the generation of adequate heat and temperature for severing and sealing the hollow fiber membranes at these lower voltages.

The end of the bundle must be subjected to a temperature above the melt temperature of the hollow fiber membranes. If the temperature is too low, the bores of the hollow fiber membranes will not seal in the desired fluid-tight manner. The maximum temperature which can be desirably employed, of course, depends upon the materials composing the hollow fiber membranes. The temperature of the heated member should not be so great that undue degradation of the material of the hollow fiber membranes occurs which significantly reduces the strength of the hollow fiber membrane. Sometimes, however, the material of the hollow fiber membrane, which contacts or is in very close proximity to the heated member during sealing, may be degraded. Although such degradation may not adversely affect the hollow fiber membranes, suitable ventilation may be required to remove noxious fumes which might be generated. The sealing may be accomplished in an inert atmosphere to minimize degradation; however, in many instances, the sealing can be conducted in air without undue adverse effects. Also, with some thermoplastic materials, if a heated member is employed and its the temperature is too high, the hollow fiber membranes may become sticky, or tacky, and increase the difficulty in sealing the hollow fiber membranes.

The temperature to which the end of the bundle is subjected will, in part, be determined by the melt temperature and the flow properties of the material of the hollow fiber membranes. Since frequently the hollow fiber membranes are comprised of amorphous polymer, the polymer melt temperature may be difficult to precisely determine. Moreover, depending on the properties of the polymer melt the minimum temperature above the polymer melt temperature which may be required to effect sealing may vary. In general, however, this temperature is preferably at least about 10° C., say, at least about 50° C., and most frequently, at least about 100° C. above the melt temperature of the hollow fiber membrane. The melt temperature as used herein is the temperature at which the hollow fiber membrane leaves a liquid trail when advanced across a temperature gradient bar. Often the temperature of a heated member, at least prior to initiation of the sealing operation, is at least about 650° C. or 700° C., and sometimes about 700° C. to 950° C. or 1000° C. Generally, for any given hollow fiber membrane a wide range of temperatures may be operable to provide the desired sealing.

Since measuring the temperature to which the end of the bundle is subjected often requires equipment such as pyrometers which may not be readily available and the temperature during the sealing may be extremely difficult to precisely ascertain, a convenient method for determining whether an appropriate temperature has been achieved is to seal a small bundle of hollow fiber membranes. If the bundle is readily sealed and melting is observed, an adequate temperature for sealing is probably achieved, otherwise the temperature should be increased. If undue degradation of material in the hollow fiber membrane or sticking is noted, the temperature should desirably be lowered or, if the degradation is due to combustion, an inert atmosphere may be indicated.

The sealing of the hollow fiber membranes in accordance with this invention is believed to be caused by the melting of the thermoplastic material of the hollow fiber membrane. The thermoplastic material of the hollow fiber membranes should be melted and is sometimes sufficiently fluid such that the thermoplastic material can flow by capillary action and/or under the influence of gravity into the bores of the hollow fiber membranes in order to provide the desired sealing. Hence, the application of an axially-applied pressure to cause such flowing and sealing may not be required.

When the bundle is also severed, e.g., by a heated member, the rate at which the heated member is passed through the bundle is such that the bores of the hollow fiber membranes are sealed in an essentially fluid-tight manner and the hollow fiber membranes are joined at the end of the bundle. If the heated member is passed through the bundle too quickly, a tendency will exist for at least some of the bores to remain open. Frequently, when the heated member is at higher temperatures, the heated member may be capable of being more quickly passed through the bundle than at lower temperatures. Also, in many instances, the heated member can be passed through the bundle more quickly when the hollow fiber membranes have a significant void volume than when the hollow fiber membranes are dense and have substantially the same bore dimensions and mass of polymer per unit length.

Usually, in severing operations the heated member is passed through the bundle slowly, e.g., at a rate of less than about 50 centimeters per minute, and most frequently, less than about 10 centimeters per minute. The heated member often passes through the bundle relatively effortlessly, indicating that primarily the heat from the heated member is effecting the severing of the hollow fiber membranes. In most instances, the passage of the heated member through the bundle is sufficiently slow that a visibly discernable zone, which zone is indicative is the melting of the thermoplastic comprising the hollow fiber membranes, exists. Similar zones are usually visible on either side of the path of the heated member. Conveniently, the heated member is passed through the bundle at a rate such that the zone preceding the heated member is approximately the same thickness as the zones on each of the side of the path. Usually, the zone is at least about 0.1, e.g., at least about 0.25, times the diameter of the hollow fiber membrane, and in some instances this thickness is about 0.2 to 10, say, about 0.5 to 5, millimeters. Once a suitable rate is determined for passing the heated member through the bundle, it can be readily appreciated that a mechanized drive means could be used to move the heated member through the bundle at the predetermined rate. Thus, the severing and sealing can be effected on a highly reliable basis.

The hollow fiber membranes at the end of the bundle to be sealed should preferably be arranged and maintained, during sealing, in substantially the desired cross-sectional configuration for the bundle when assembled in a permeator. Clearly, any manipulation of the configuration of the sealed end of the bundle which contains joined membranes may increase the risk of damage to the holow fiber membranes, and should be avoided. The end of the bundle may be maintained in the desired cross-sectional configuration by any suitable means. For instance, when the cross-sectional configuration of the bundle is sought to be circular, sufficient support for maintaining the desired configuration of the bundle at the zone may be supplied by wrapping or binding the bundle at, or adjacent to, the zone which is to be the end of the bundle. Alternatively, rigid supports for holding the bundle is a desired configuration may be provided. With bundles which have small cross-sections or where significant tolerances in cross-sectional configuration are acceptable, the cross-sectional configuration of the bundle at the zone to be sealed may be sufficiently maintained by hand.

The processes of this invention may find application for sealing the bores and joining hollow fiber membranes at the ends of bundles having a wide variety of cross-sectional configurations and dimensions. The cross-sectional configuration may be circular, oval, polygonal (e.g., rectangular, square, trapezoidal, etc.) free form, or the like. The maximum cross-sectional dimension of a bundle may be up to 1 meter or more. Bundles having circular cross-sectional configurations are often most preferred for use in permeators and frequently have cross-sectional diameters of, e.g., 0.05 to 0.5 or 1 meter. The end of the bundle may be substantially flat and perpendicular to the longitudinal orientation of the hollow fiber membranes, or it may be at an angle to the orientation of the hollow fiber membranes. Alternatively, the end of the bundle may be curved, e.g., convexly, concavely or both, or it may be hemispherical, conical, or such other shapes as may be suitable. Frequently, it is preferred that the end of the bundle be substantially flat and perpendicular to the longitudinal orientation of the hollow fiber membranes for sake of convenience in manufacturing.

The processes of this invention may be useful in sealing bundles having a wide variety of packing factors of the hollow fiber membranes. A packing factor, as used herein, is the percentage of a given cross-sectional area which is occupied by hollow fiber membranes (including the area occupied by the bores of the hollow fiber membranes). The packing factor based on the inside cross-sectional dimensions of the permeator shell and the cross-sectional area of the hollow fiber membranes is preferably at least about 35, say, about 40 or 45 to 50 or 60, percent. The packing factor based on the inside dimensions of the permeator shell may be different than the actual packing factor of the bundle at the end to be sealed. In many instances it may be desired to laterally compact the end which is to be sealed. This lateral compaction may enhance the joining of adjacent hollow fiber membranes. The lateral compaction at the end of the bundle often facilitates the insertion of the bundle of hollow fiber membranes into a permeator shell or into a mold for casting, e.g., a tube sheet. Most frequently, the actual packing factor of the end of the bundle based on the outside dimensions of the end of the bundle is sufficiently high that substantially all of the hollow fiber membranes contact other hollow fiber membranes. Often the actual packing factor at the end of the bundle is at least about 45 percent and may range up to 70 or more percent, e.g., about 50 to 65 percent.

The hollow fiber membranes may be of any suitable cross-sectional configuration although most frequently hollow fiber membranes are circular with a concentric bore. The processes of this invention are useful for severing hollow fiber membranes within a wide range of diameters. However, the hollow fiber membranes should have sufficient wall thickness to provide adequate strength during the intended separation operation. Frequently, the outside diameter of the hollow fiber membranes is at least about 20, say, at least about 50, microns, and the same or different outside diameter hollow fiber membranes may be contained in a bundle. Often, the outside diameters are up to about 800 or 1,000 microns. Preferably, the outside diameter of the hollow fiber membranes is about 50 to 800 microns, say, about 150 to 800 microns. Generally, the wall thickness of the hollow fiber membranes is at least about 5 microns, and in some hollow fiber membranes, the wall thickness may be up to about 200 or 300 microns, say, about 50 to 200 microns. Preferably, the inside diameter (bore diameter) of the hollow fiber membranes is less than about 500 microns, e.g., about 50 to 500, microns, say, about 50 to 300 microns.

The processes of this invention are useful in sealing the ends of bundles having hollow fiber membranes which have solid walls as well as those hollow fiber membranes having walls with voids. The hollow fiber membranes may be isotropic or anisotropic. Preferably, the hollow fiber membranes have walls with a substantial void volume. Voids are regions within the walls of the hollow fiber membranes which are vacant of the material of the hollow fiber membranes. Thus, when voids are present, the density of the walls of the hollow fiber membrane is less than the density of the bulk of material of the hollow fiber membrane. Hollow fiber membranes having walls with a substantial void volume can often be more readily sealed than can hollow fiber membranes of the same material and bore dimensions but having dense walls. Moreover, even when the hollow fiber membranes are anisotropic with thin and highly fragile dense skins (especially exterior skins), the sealing can be accomplished without adversely affecting the membrane performance or strength. Frequently, the void volume in accordance with this aspect of the invention is about 20 to 80, and most often, about 30 to 70, percent based on the superficial volume, i.e., the volume contained within the gross dimensions of the walls of the hollow fiber membrane.

Preferably, the hollow fiber membranes are substantially dry (e.g., the membranes contain less than about 5, e.g., less than about 1 or 2, weight percent liquid) during the sealing such that the heat of the heated member is utilized for sealing and not for evaporating liquid, e.g., water.

The bores of the hollow fiber membranes should be substantially unobstructed. The sealing of the hollow fiber membranes in accordance with this invention should only obstruct the bores of the hollow fiber membranes at the end of the bundle. Often the thickness of the material closing the bores of the hollow fiber membranes is at least about 25 or 50, say, at least about 75 or 100 to about 1000 or 5000, microns.

The hollow fiber membranes may be fabricated from any synthetic or natural material which is suitable for fluid separations or for a support for materials which effect the fluid separations. The hollow fiber membrane comprises thermoplastic material, and preferably the thermoplastic material comprises at least about 70, or 80 or more, weight percent of the hollow fiber membrane. The selection of the material for the hollow fiber membrane may be based on the heat resistance, chemical resistance, and/or chemical strength of the hollow fiber membrane as well as other factors dictated by the intended fluid separation for which it will be used and the operating conditions to which it will be subjected.

Typical materials for hollow fiber membranes include thermoplastic organic polymers or thermoplastic organic polymer mixed with inorganics, e.g., fillers, reinforcements, and the like. Thermoplastic polymers which may be suitable for hollow fiber membranes can be substituted or unsubstituted polymers, especially carbon based polymers having carbon-carbon or carbon-oxygen backbones, and may be selected from polysulfones; poly(styrenes), including styrene-containing copolymers such as acrylonitrilestyrene copolymers, styrene-butadiene copolymers and styrenevinylbenzylhalide copolymers; polycarbonates; cellulosic polymers (thermoplastic); polyamides and polyimides, including aryl polyamides and aryl polyimides; polyethers; poly(arylene oxides) such as poly(phenylene oxide) and poly(xylylene oxide); poly(esteramidediisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers, poly(vinyl ketones), poly(vinyl aldehydes) such as poly(vinyl formal) and poly(vinyl butyral), poly(vinyl amines), poly(vinyl phosphates), and poly(vinyl sulfates); and poly(vinyl acetal); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of parasulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The following example is provided to further illustrate the invention and is not intended to limit the invention. The example is directed to providing a bundle having a sealed end having bands similar to those depicted in the schematic illustration of FIG. 4.

Approximately 100,000 hollow fiber membranes about 3 meters in length are formed into a bundle having a diameter of about 20 to 25 centimeters. The hollow fiber membranes have an outside diameter of about 450 microns and a wall thickness of about 150 microns and are composed of polysulfone having the repeating structure

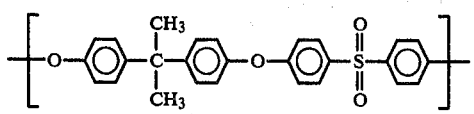

(available from Union Carbide Corporation as P-3500 ™). The hollow fiber membranes are anisotropic with a skin of less than 0.5 micron in thickness and an open cellular wall structure. The wall has a void volume of about 60 percent. The bundle is suspended vertically, and a polyethylene tube (approximately 20 centimeters in diameter and 100 microns in thickness) is placed around the bundle for the length of the bundle.

The apparatus to be used to sever the bundle and seal and join the hollow fiber membranes comprises a horizontal platform mounted on wheels for travel over a horizontal surface below the bundle. Two posts extend vertically from the platform and are spaced about 30 centimeters apart. An arm extends horizontally outward from each of the two posts. The arms are about 30 centimeters from the platform and are parallel. Insulators are provided on each arm and a Nichrome ™ wire, 24 gage, extends between each arm and is fastened to the insulators by springs such that the wire is maintained taut. The wire is connected by alligator clips spaced about 30 centimeters apart to a variable voltage transformer. The resistance of the wire at room temperature between the alligator clips is about 3.5 ohms.

The bundle is prepared for severing as follows. The polyethylene tube is pulled from the bottom of the bundle such that the zone to be severed is exposed. A glass rod is used to part the bundle. A piece of paper which is about 75 microns thick and has a length of about 28 centimeters and a width of about 22 centimeters is folded lengthwise and inserted into the part such that it extends through the bundle at the zone to be severed. This procedure is repeated four times to provide parallelly-extending papers about 4 centimeters apart. Rubber bands are then placed around the bundle about 1 to 2 centimeters above and below the zone to be severed. The polyethylene tube is moved down to recover the zone to be severed. A fiber board tube having a longitudinal split and an inside diameter of about 23 centimeters is placed around the bundle about 3 centimeters above the zone to be severed. The fiber board tube overlaps itself at the split and is tightened and secured such that the circular shape of the bundle is maintained.

The severing is effected by aligning the zone to be severed with the wire and then energizing the wire about 10.5 volts. The apparatus is then rolled by hand such that the wire passes through the bundle. The speed of the apparatus is substantially constant and is about 2 to 3 centimeters per minute. While the apparatus is manually moved, it is readily apparent that mechanized propulsion such as provided by motors, springs, etc., could alternatively be used. The bundle is prevented from undue swinging by being steadied by hand. After severing, the rubber band and fiber board tube on the bundle are removed. The paper is easily withdrawn and appears to be charred at the edge severed by the wire. The bores of the hollow fiber membrane are sealed due to the severing and substantially all of the hollow fiber membranes adhere to one and another at the severed end in five zones which are separated where the paper was positioned.

It is claimed:

1. In a process for sealing the bores of a plurality of hollow fiber membranes comprised of thermoplastic material, which hollow fiber membranes are arranged in the form of a bundle, comprising subjecting an end of the bundle, which end is transverse to the orientation of the hollow fiber membranes, to sufficient heat to melt the ends of the hollow fiber membranes in order to cause hollow fiber membranes to adhere at the end of the bundle to adjacent hollow fiber membranes, the improvement comprising placing a substantially non-sealing insert member within and at the end of the bundle prior to and during subjecting the end of the bundle to the heat whereby said substantially non-sealing insert member provides a boundary to the adhering of hollow fiber membranes and results in passageways being provided through the end of the bundle.

2. The process of claim 1 wherein the temperature to which the ends of the hollow fiber membranes are subjected is at least about 50° C. above the polymer melt temperature of the hollow fiber membranes.

3. The process of claim 1 or 2 wherein the inside diameter of the hollow fiber membrane is about 50 to 500 microns.

4. The process of claim 1 or 2 wherein the hollow fiber membranes have walls with a substantial void volume.

5. The process of claim 1 wherein the hollow fiber membranes are anisotropic with a thin, dense exterior skin and have a void volume of about 30 to 70 percent.

6. The process of claim 1, 2 or 5 wherein the temperature to which the ends of the hollow fiber membranes are subjected is about 700° to 950° C.

7. The process of claim 1, 2 or 5 wherein the hollow fiber membrane comprises polysulfone.

8. The process of claim 1 wherein the packing factor of the bundle at the zones through which the heated member passes is about 50 to 65 percent.

9. The process of claim 1 wherein the insert member has a low affinity to the hollow fiber membranes.

10. The process of claim 1 wherein the insert member is a substantially non-thermoplastic material.

11. The process of claim 1 wherein the insert member comprises a cellulosic-type material which chars and becomes frangible upon heating.

12. The process of claim 1 wherin the insert member is of an open structure.

13. The process of claim 1 wherein the insert member is of a closed structure.

14. The process of claim 1 wherein the insert member defines segments and the segments are spaced apart.

15. The process of claim 1 or 14 wherein the cross-sectional configuration of the bundle is circular and at least one insert member extends through the width of the bundle and defines pie-shaped segments.

16. The process of claim 1 wherein the cross-sectional configuration of the bundle is circular.

17. The process of claim 1, 14 or 16 wherein at least one insert member extends through the width of the bundle and defines segments shaped as bands.

18. The process of claim 1 wherein the bundle is severed using heat to form the end of the bundle and the heat closes the bores of the hollow fiber membranes and causes hollow fiber membranes to adhere to adjacent hollow fiber membranes.

19. The process of claim 1 or 18 wherein the heat is provided by a heated member.

20. The process of claim 1 or 18 wherein the heat is provided by a heated member and the temperature of the heated member is at least 700° C.

21. The process of claim 1 or 18 wherein the heat is provided by a heated member and the heated member comprises an electrical resistance material and heat is generated by passing an electrical current through the heated member.

22. The process of claim 1, 9 or 10 wherein the insert member is removed from the bundle after subjecting the end of the bundle to the heat.

* * * * *